Patented Aug. 5, 1941

2,251,871

UNITED STATES PATENT OFFICE 2,251,871

ZINC OXIDE PIGMENT

David L. Gamble and James H. Haslam, Palmerton, Pa., assignors to The New Jersey Zinc Company, New York, N. Y., a corporation of New Jersey No Drawing. Application May 1, 1941, Serial No. 391,408

11 Claims. (Cl. 106—296)

This invention relates to the manufacture of zinc oxide pigments in which the zinc oxide particles are surface-coated with a zinc phosphate. In our copending application for Letters Patent of the United States, Serial No. 266,410 filed April 6, 1939, we have described and claimed such zinc oxide pigments, and have pointed out that such pigments are characterized by reduced reactivity towards acidic constituents of paint vehicles and by a high resistance to metallic staining.

This application is a continuation in part of our copending application Serial No. 267,322 filed April 11, 1939. The present invention is particularly directed to pyro-metallurgical methods of coating zinc oxide with phosphates for the production of zinc oxide pigments possessing substantially the same properties as the zinc oxide pigments described and claimed in our aforementioned application Serial No. 266,410. In accordance with the methods of the invention, the surfaces of zinc oxide particles are caused to react with an ester of a phosphoric acid by heating the zinc oxide while the surfaces of its particles are in intimate contact with the ester. In its more general aspect, the invention involves intimately contacting dry and heated zinc oxide particles with an ester of phosphoric acid and thus transforming the surfaces of a large part of the zinc oxide particles to a zinc phosphate, and preferably to zinc metaphosphate. Depending upon the particular ester employed and the method of obtaining intimate contact of the zinc oxide particles therewith, the zinc oxide particles may be heated to a temperature of from about 100° C. to about 900° C. or even higher. At the higher temperatures, care should be taken to avoid or minimize particle size growth of the zinc oxide particles by limiting the time that such particles are exposed to the high temperature. Among the esters of phosphoric acid that may be used in practicing the invention are alkyl and aryl phosphates, including ortho-, pyro- and metaphosphates. All of these are capable of transforming the surfaces of a large part of the zinc oxide particles to a zinc phosphate.

The invention will be best understood from the following illustrative examples of its practice. While the methods described in these examples are particularly effective in forming phosphate coatings upon zinc oxide, the invention may be practiced in other ways, and the examples are to be understood as illustrating the principles underlying the invention and in no way restrictive of its practical application.

*Example 1.*—Zinc oxide is heated with esters of phosphoric acid, such as aryl or alkyl phosphates, in such fashion that these phosphates are decomposed while in contact with the surface of the zinc oxide particles, with resulting formation of phosphate coatings. Esters of phosphoric acid are liquid at ordinary temperature and highly volatile. Moreover, while in either liquid or vapor form they are vigorously adsorbed by zinc oxide, so that they can readily be dispersed over the surfaces of the zinc oxide particles to be treated. The phosphoric acid esters are readily decomposed by heat, and the organic radicals are highly combustible.

The esters should be employed in proportions sufficient to coat a large proportion of the surface area of the zinc oxide particles with zinc phosphates. The optimum proportion in a particular case will depend upon the fineness of the zinc oxide and the particular kind of ester employed. In general the esters should be about 0.2% to 5% on the weight of the zinc oxide, but it is preferable to use from 1 to 5%.

The following substances have been successfully used in the practice of the invention:

(Alkyls) $\begin{cases} \text{triethyl orthophosphate } (C_2H_5)_3PO_4 \\ \text{trimethyl orthophosphate } (CH_3)_3PO_4 \\ \text{tributyl orthophosphate } (C_4H_9)_3PO_4 \end{cases}$ (Aryls) $\begin{cases} \text{triphenyl orthophosphate } (C_6H_5)_3PO_4 \\ \text{tricresyl orthophosphate} \\ \quad (CH_3.C_6H_4)_3PO_4 \end{cases}$ (Alkyls) $\begin{cases} \text{ethyl acid pyrophosphate} \\ \quad (C_2H_5)_2H_2P_2O_7 \\ \text{ethyl metaphosphate } C_2H_5PO_3 \end{cases}$ Zinc oxide may be treated with these substances in the following ways:

1. The volatile and liquid phosphoric acid ester is atomized directly into the combustion chamber of a zinc oxide furnace maintained at a high temperature, say 700 to 1000° C. or higher. In this way freshly formed zinc oxide is brought into contact with a phosphoric acid ester (preferably an ester of metaphosphoric acid such as ethyl metaphosphate) at such temperatures and thus coated rapidly with a zinc phosphate. In case the liquid is too viscous to atomize readily, an ethyl alcoholic solution of it may be used. The phosphoric acid ester reacts with the zinc oxide in the combustion chamber with formation of a zinc phosphate coating on the particles of zinc oxide. The hydrocarbon radical of the ester is removed by combustion. In this method of introducing the phosphoric acid ester it is desirable to keep the spray away from the zinc flame, in order to prevent the formation of separate particles of zinc phosphate by direct reaction with zinc vapor. Satisfactory results are obtained employing about 2% ethyl metaphosphate on the weight of the zinc oxide.

2. The phosphoric acid ester may be atomized into fume of hot, freshly formed zinc oxide at a point just beyond the combustion chamber where the oxide is formed. If the fume is sufficiently hot, say at a temperature of 1000° C., the ester is decomposed by heat immediately after being adsorbed by the zinc oxide particles, and a zinc phosphate coating is formed on the zinc oxide particles. If the temperature is not sufficiently high to decompose the ester, subsequent reheating should be practiced.

3. Cold zinc oxide may be coated with the liquid phosphoric acid ester by spraying and mixing and then reheating to decompose the ester and bring about the formation of phosphate coatings. In this case the reheating should be carried out preferably at temperatures of 450° C. or higher; in some cases 800° C. may be attained. Reheating for a too long time at a too high temperature may adversely affect the result, apparently due to rendering the coating pervious, perhaps on account of growth of the zinc oxide particles. On the other hand, too low temperatures do not decompose the ester at an adequate rate to produce effective phosphate coating.

When esters of orthophosphoric acid are used, the coating upon the zinc oxide particles consists predominantly of zinc pyrophosphate with some zinc orthophosphate. The presence of these two phosphates can be established by examination of the infrared absorption spectra of the treated zinc oxide. Such spectra show bands characteristic of zinc pyrophosphate and also fainter bands characteristic of zinc orthophosphate. When ethyl metaphosphate is used, the coating obtained on the zinc oxide particles consists of zinc metaphosphate. The presence of the meta phosphate can be recognized by the infrared absorption spectrum of the treated zinc oxide, which in this case shows absorption bands characteristic of zinc metaphosphate. The zinc metaphosphate coating is more stable and adherent than the coatings of zinc pyrophosphate plus zinc orthophosphate obtained by the use of the esters of orthophosphoric acid, and we therefore prefer the use of ethyl metaphosphate.

The preferred method of introducing the esters of phosphoric acid is direct introduction into the combustion chamber of the zinc oxide furnace. However, it is distinctly not desirable to introduce these esters directly into a vessel in which metallic zinc is being boiled, since in that case direct reaction with metallic zinc occurs with resulting formation of a dross of zinc phosphates upon the surface of the boiling zinc. The next best method is to bring the hot, freshly formed zinc oxide fume into contact with the esters as promptly after the formation of the zinc oxide as possible.

In determining by infrared absorption spectra methods the type of zinc phosphate coating obtained, the following procedure is used. The pigment to be examined is mulled thoroughly with amyl alcohol and a thin layer of the pigment alcohol paste is spread on a plate of rock salt or of other substance transparent to infrared. After the alcohol has evaporated, the absorption spectrum of the film of dry powder is determined. Zinc metaphosphate exhibits a sharp absorption band in the neighborhood of 9 mu. In the case of zinc orthophosphate, the absorption band in this region is very much broader and in the case of zinc pyrophosphate the band is still more broad and diffuse. On the basis of these characteristic differences in the absorption spectra, it is quite easy to distinguish the zinc metaphosphate from either the ortho- or pyrophosphate. To distinguish the orthophosphate from the pyrophosphate is considerably more difficult and the indications obtained less reliable. The intensity of the absorption band, that is, its depth, is a function of both the amount of phosphate associated with the zinc oxide as well as the uniformity of distribution.

In the following table a comparison is made of the reactivities of zinc oxide phosphated by treatment with a phosphoric ester with (1) a zinc oxide wet-treated with metaphosphoric acid and having a relatively high degree of non-reactivity, and (2) normal untreated zinc oxide. The reactivity numbers appearing in the table are a measure of the reactivity of the several zinc oxides with the acidic constituents of oleoresinous vehicles, and were obtained as follows: The sample of zinc oxide pigment is suspended in a solution of linseed fatty acids in alcohol of known concentration. The pigment is allowed to stand in contact with this solution for 1½ hours and the concentration of fatty acid remaining in solution with the alcohol is determined after this time interval. If the zinc oxide is reactive, the concentration of fatty acid in solution will be reduced by virtue of the reaction of the zinc oxide and the fatty acid to form insoluble soap. The changes in concentration are determined by index of refraction methods. The reactivity is expressed in terms of the per cent of original concentration of fatty acids remaining after 1½ hours' contact with the pigment. The greater the reactivity number expressed in this way the less reactive is the zinc oxide.

| | Description of zinc oxide sample | Reactivity number. Percent of original concentration of fatty acids remaining after 1½ hours' contact with pigment |
|---|---|---|
| 1 | Ethyl metaphosphate atomized into combustion chamber of laboratory experimental zinc oxide furnace | 91.0 |
| 2 | The same oxide as No. 1 given a reheating for 15 minutes at 800° C | 98.5 |
| 3 | Wet treatment of zinc oxide with 3% metaphosphoric acid | 99.0 |
| 4 | Normal untreated zinc oxide | 35 |

A zinc oxide pigment having its particles surface-coated with a zinc phosphate in accordance with the invention possesses substantially the same desirable properties of reduced reactivity towards acidic constituents of paint vehicles and high resistance to metallic staining as do the zinc oxide pigments whose particles are similarly coated with a zinc phosphate by wet methods as described and claimed in our aforementioned copending application Serial No. 266,410. As compared with wet methods of coating zinc oxide particles with zinc phosphate, the methods of the invention avoid the handling of large quantities of solutions or slurries, and the consequent use of mixing, filtering and drying equipment is either entirely eliminated or greatly restricted.

We claim:

1. In the manufacture of a zinc oxide pigment, the improvement which comprises heating zinc oxide while the surfaces of its particles are in contact with an ester of a phosphoric acid to a temperature such that the ester is decomposed and thereby imparting a zinc phosphate coating to the zinc oxide particles.

2. In the manufacture of a zinc oxide pigment, the improvement which comprises forming a zinc phosphate coating on the surface of zinc oxide particles by heating zinc oxide in intimate contact with an ester of a phosphoric acid at a temperature such that the ester is decomposed.

3. In the manufacture of a zinc oxide pigment in which the zinc oxide particles are surface-coated with a zinc phosphate, the improvement which comprises intimately contacting dry and heated zinc oxide particles with a phosphoric acid ester at a temperature sufficient to bring about reaction of the ester with the zinc oxide and thereby imparting a zinc phosphate coating to the zinc oxide particles.

4. In the manufacture of a zinc oxide pigment in which the zinc oxide particles are surface-coated with a zinc phosphate, the improvement which comprises intimately contacting dry and heated zinc oxide particles at a temperature of at least about 100° C. with ethyl metaphosphate and thereby imparting a zinc metaphosphate coating to the surfaces of a large part of the zinc oxide particles.

5. In the manufacture of a zinc oxide pigment in which the zinc oxide particles are surface-coated with a zinc phosphate, the improvement which comprises intimately contacting freshly-formed zinc oxide particles at a temperature of from about 700° C. to about 1000° C. with ethyl metaphosphate and thereby imparting a zinc metaphosphate coating to the surfaces of a large part of the zinc oxide particles.

6. In the manufacture of a zinc oxide pigment, the improvement which comprises intimately contacting freshly-formed zinc oxide particles in the combustion chamber of a zinc oxide furnace with an ester of a phosphoric acid at a temperature such that the ester is decomposed and thereby imparting a zinc phosphate coating to the surfaces of a large part of the zinc oxide particles.

7. In the manufacture of a zinc oxide pigment, the improvement which comprises introducing into the combustion chamber of a zinc oxide furnace during formation of zinc oxide particles therein an ester of a phosphoric acid the combustion chamber being maintained at a temperature of at least about 700° C. and thereby imparting a zinc phosphate coating to the surfaces of a large part of the zinc oxide particles.

8. In the manufacture of a zinc oxide pigment, the improvement which comprises introducing an ester of a phosphoric acid into zinc oxide fume in the flue system beyond the combustion chamber of a zinc oxide furnace, heating the ester in contact with the zinc oxide to bring about decomposition of the ester and thereby imparting a zinc phosphate coating to the surfaces of a large part of the zinc oxide particles in the fume.

9. In the manufacture of a zinc oxide pigment, the improvement which comprises intimately contacting zinc oxide fume in the flue system of a zinc oxide furnace and while the fume is heated to a high temperature with an ester of a phosphoric acid, the temperature being in excess of that necessary to decompose the ester, and thereby imparting a zinc phosphate coating to the surfaces of a large part of the zinc oxide particles in the fume.

10. In the manufacture of a zinc oxide pigment in which the zinc oxide particles are surface-coated with a zinc phosphate, the improvement which comprises introducing an ester of metaphosphoric acid into zinc oxide fume in the flue system beyond the combustion chamber of a zinc oxide furnace, the flue system being maintained at a temperature sufficient to bring about decomposition of the ester in contact with the zinc oxide, and thereby imparting a zinc metaphosphate coating to the surfaces of a large part of the zinc oxide particles in the fume.

11. In the manufacture of a zinc oxide pigment, the improvement which comprises coating relatively cold zinc oxide particles with an ester of a phosphoric acid and heating the coated zinc oxide particles to a temperature of at least about 450° C.

DAVID L. GAMBLE.
JAMES H. HASLAM.